United States Patent
Soane et al.

(10) Patent No.: US 9,932,521 B2
(45) Date of Patent: Apr. 3, 2018

(54) CALCIUM ION TOLERANT SELF-SUSPENDING PROPPANTS

(71) Applicant: Self-Suspending Proppant LLC, Cambridge, MA (US)

(72) Inventors: David S. Soane, Chestnut Hill, MA (US); Robert P. Mahoney, Newbury, MA (US); Marie K. Herring, Watertown, MA (US); Kevin P. Kincaid, Salt Lake City, UT (US); Rosa Casado Portilla, Peabody, MA (US)

(73) Assignee: SELF-SUSPENDING PROPPANT, LLC, Chesterland, OH (US)

( * ) Notice: Subject to any disclaimer, the term of this patent is extended or adjusted under 35 U.S.C. 154(b) by 149 days.

(21) Appl. No.: 14/631,946

(22) Filed: Feb. 26, 2015

(65) Prior Publication Data

US 2015/0252253 A1    Sep. 10, 2015

Related U.S. Application Data

(60) Provisional application No. 61/948,227.

(51) Int. Cl.
*C09K 8/80* (2006.01)
*E21B 43/267* (2006.01)

(52) U.S. Cl.
CPC .................. *C09K 8/805* (2013.01)

(58) Field of Classification Search
None
See application file for complete search history.

(56) References Cited

U.S. PATENT DOCUMENTS

| | | | |
|---|---|---|---|
| 2,703,316 A | 3/1955 | Schneider | |
| 3,912,692 A | 10/1975 | Casey et al. | |
| 4,022,736 A | 5/1977 | Schmitt et al. | |
| 4,387,769 A | 6/1983 | Erbstoesser et al. | |
| 4,417,989 A * | 11/1983 | Hunter | C09K 8/588 137/13 |
| 4,532,052 A | 7/1985 | Weaver et al. | |
| 5,124,376 A | 6/1992 | Clark, Jr. | |
| 5,151,615 A | 11/1992 | Hutchins et al. | |
| 5,161,615 A | 11/1992 | Hutchins et al. | |
| 5,216,050 A | 6/1993 | Sinclair | |
| 5,728,742 A | 3/1998 | Staples et al. | |
| 5,837,656 A | 11/1998 | Sinclair et al. | |
| 5,924,488 A | 7/1999 | Nguyen et al. | |
| 5,925,714 A | 7/1999 | Larson et al. | |
| 6,065,674 A | 5/2000 | Shriver | |
| 6,109,350 A | 8/2000 | Nguyen et al. | |
| 6,169,058 B1 | 1/2001 | Le et al. | |
| 6,279,656 B1 | 8/2001 | Sinclair | |
| 6,323,307 B1 | 11/2001 | Bigg et al. | |
| 6,364,018 B1 * | 4/2002 | Brannon | C09K 8/68 166/280.2 |
| 6,605,674 B1 | 8/2003 | Whipple et al. | |
| 6,667,374 B2 | 12/2003 | Hermandez-Barajas et al. | |
| 6,734,147 B2 | 5/2004 | Levy | |
| 6,742,590 B1 | 6/2004 | Nguyen | |
| 6,866,099 B2 | 3/2005 | Nguyen | |
| 6,892,813 B2 | 5/2005 | Nguyen et al. |
| 7,021,379 B2 | 4/2006 | Nguyen |
| 7,032,667 B2 | 4/2006 | Nguyen et al. |
| 7,044,220 B2 | 5/2006 | Nguyen et al. |
| 7,131,491 B2 | 11/2006 | Blauch et al. |
| 7,132,389 B2 | 11/2006 | Lee |
| 7,135,231 B1 | 11/2006 | Sinclair et al. |
| 7,178,596 B2 | 2/2007 | Blauch et al. |
| 7,204,312 B2 | 4/2007 | Roddy et al. |
| 7,216,711 B2 | 5/2007 | Todd et al. |
| 7,228,904 B2 | 6/2007 | Todd et al. |
| 7,244,492 B2 | 7/2007 | Sinclair et al. |
| 7,261,156 B2 | 8/2007 | Nguyen et al. |
| 7,264,051 B2 | 9/2007 | Nguyen et al. |
| 7,299,869 B2 | 11/2007 | Kalman |
| 7,308,939 B2 | 12/2007 | Welton et al. |
| 7,442,741 B2 | 10/2008 | Boyer et al. |
| 7,461,697 B2 | 12/2008 | Todd et al. |
| 7,482,309 B2 | 1/2009 | Ravi et al. |
| 7,490,667 B2 | 2/2009 | Sinclair et al. |
| 7,571,767 B2 | 8/2009 | Parker et al. |
| 7,666,469 B2 | 2/2010 | Weintritt et al. |
| 7,718,583 B2 | 5/2010 | Barmatov et al. |
| 7,721,804 B2 | 5/2010 | Duenckel |
| 7,726,070 B2 | 5/2010 | Thrash |
| 7,730,948 B2 | 6/2010 | de Grood et al. |
| 7,754,659 B2 | 7/2010 | Rediger et al. |
| 7,772,163 B1 | 8/2010 | Brannon et al. |
| 7,772,741 B1 | 8/2010 | Rittenhouse |
| 7,789,147 B2 | 9/2010 | Brannon et al. |
| 7,902,128 B2 | 3/2011 | Zhang et al. |
| 7,921,084 B2 | 4/2011 | Nguyen et al. |
| 7,931,084 B2 | 4/2011 | Nguyen et al. |
| 7,931,087 B2 | 4/2011 | Gupta |
| 7,931,089 B2 | 4/2011 | Miller et al. |
| 7,934,554 B2 | 5/2011 | Roddy |
| 7,968,501 B2 | 6/2011 | Parris |
| 7,972,997 B2 | 7/2011 | Svoboda et al. |
| 8,058,213 B2 | 11/2011 | Rediger et al. |
| 8,062,998 B2 | 11/2011 | Fulton et al. |
| 8,066,068 B2 | 11/2011 | Lesko et al. |
| 8,105,986 B2 | 1/2012 | Zhang |
| 8,127,849 B2 | 3/2012 | Gupta |
| 8,236,738 B2 | 8/2012 | Zhang |
| 8,240,383 B2 | 8/2012 | Xu et al. |

(Continued)

FOREIGN PATENT DOCUMENTS

| CA | 276357 | 12/1927 |
|---|---|---|
| CA | 2763357 | 12/2010 |

(Continued)

OTHER PUBLICATIONS

Office Action from U.S. Appl. No. 13/599,828 dated May 6, 2015.

(Continued)

*Primary Examiner* — Jeffrey Washville
(74) *Attorney, Agent, or Firm* — Calfee, Halter & Griswold LLP

(57) ABSTRACT

A self-suspending proppant comprises a proppant particle substrate carrying a coating of an anionic hydrogel-forming polymer. The detrimental effect of calcium and other divalent ions on the ability of the proppant to swell when contacted with water is reduced by including a calcium binding agent in the proppant.

24 Claims, No Drawings

(56) References Cited

U.S. PATENT DOCUMENTS

| | | |
|---|---|---|
| 9,297,244 B2 | 3/2016 | Mahoney |
| 9,315,721 B2 | 4/2016 | Mahoney et al. |
| 2003/0106713 A1 | 6/2003 | Slater et al. |
| 2003/0131998 A1 | 7/2003 | Nguyen et al. |
| 2004/0188089 A1 | 2/2004 | Nguyen |
| 2004/0081015 A1 | 4/2004 | Graham |
| 2004/0244978 A1 | 12/2004 | Shaarpour |
| 2005/0006095 A1 | 1/2005 | Justus et al. |
| 2005/0019574 A1 | 1/2005 | McCrary |
| 2005/0115710 A1 | 6/2005 | Kotler et al. |
| 2005/0123590 A1 | 6/2005 | Barton |
| 2005/0167105 A1 | 8/2005 | Roddy et al. |
| 2005/0194141 A1 | 9/2005 | Sinclair et al. |
| 2005/0244641 A1 | 11/2005 | Vincent |
| 2005/0274510 A1 | 12/2005 | Nguyen et al. |
| 2006/0175059 A1 | 8/2006 | Sinclair et al. |
| 2006/0185847 A1 | 8/2006 | Saini et al. |
| 2006/0211776 A1 | 9/2006 | Crews |
| 2007/0202318 A1 | 8/2007 | Smith et al. |
| 2007/0227732 A1 | 10/2007 | Miller et al. |
| 2007/0246214 A1 | 10/2007 | Fish et al. |
| 2008/0108524 A1 | 5/2008 | Willberg et al. |
| 2008/0176009 A1 | 7/2008 | Chereau et al. |
| 2008/0011477 A1 | 8/2008 | Rediger et al. |
| 2008/0257553 A1 | 10/2008 | Gatlin et al. |
| 2008/0257833 A1 | 10/2008 | Fite et al. |
| 2008/0289828 A1 | 11/2008 | Hutchins et al. |
| 2009/0038797 A1 | 2/2009 | Skala et al. |
| 2009/0038799 A1 | 2/2009 | Garcia-Lopez De Victoria et al. |
| 2009/0062154 A1 | 3/2009 | Windebank et al. |
| 2009/0071653 A1 | 3/2009 | Hodge |
| 2009/0099047 A1 | 4/2009 | Cunningham et al. |
| 2009/0305912 A1* | 12/2009 | McDonald ............ C09K 8/08 507/108 |
| 2010/0089581 A1 | 4/2010 | Nguyen et al. |
| 2010/0126726 A1 | 5/2010 | Armstrong |
| 2010/0147515 A1 | 6/2010 | Hughes et al. |
| 2010/0167965 A1 | 7/2010 | Sebastian et al. |
| 2010/0204071 A1 | 8/2010 | Zhang |
| 2010/0249273 A1 | 9/2010 | Scales et al. |
| 2010/0252262 A1 | 10/2010 | Ekstrand et al. |
| 2010/0256024 A1 | 10/2010 | Zhang |
| 2010/0270023 A1 | 10/2010 | Dusterhoft |
| 2010/0307749 A1 | 12/2010 | Nguyen et al. |
| 2011/0098377 A1 | 4/2011 | Huang et al. |
| 2011/0120719 A1 | 5/2011 | Soane et al. |
| 2011/0289841 A1 | 12/2011 | Thrash |
| 2012/0018162 A1 | 1/2012 | Tanguay et al. |
| 2012/0058355 A1 | 3/2012 | Lee et al. |
| 2012/0067576 A1* | 3/2012 | Reyes ............ C09K 8/74 166/279 |
| 2012/0071371 A1 | 3/2012 | Zhang |
| 2012/0080192 A1 | 4/2012 | Hendrickson et al. |
| 2012/0225800 A1 | 9/2012 | Hendrickson |
| 2012/0267105 A1 | 10/2012 | Zhang |
| 2012/0267112 A1 | 10/2012 | Zhang et al. |
| 2013/0196884 A1* | 8/2013 | Kakadjian ............ C09K 8/805 507/203 |
| 2013/0233545 A1 | 9/2013 | Mahoney |
| 2014/0000891 A1 | 1/2014 | Mahoney et al. |
| 2014/0060832 A1 | 3/2014 | Mahoney |
| 2014/0076558 A1 | 3/2014 | Nguyen et al. |
| 2014/0087974 A1 | 3/2014 | Villarreal |
| 2014/0138092 A1 | 5/2014 | Reddy et al. |
| 2014/0228258 A1 | 8/2014 | Mahoney et al. |
| 2015/0252252 A1 | 9/2015 | Soane et al. |

FOREIGN PATENT DOCUMENTS

| | | |
|---|---|---|
| CN | 1894284 A | 1/2007 |
| CN | 102127415 | 7/2011 |
| CN | 102167969 A | 8/2011 |
| CN | 104379697 A | 2/2015 |
| CN | 204379697 A | 2/2015 |
| EP | 0101855 A | 3/1984 |
| EP | 0933414 | 4/2003 |
| EP | 2066761 | 2/2009 |
| EP | 2027361 | 6/2009 |
| EP | 2175004 A | 4/2010 |
| EP | 2433998 | 3/2012 |
| EP | 1654439 B | 6/2012 |
| JP | 05237369 | 9/1993 |
| JP | 10054990 | 2/1998 |
| JP | 200014604 | 5/2000 |
| JP | 2001058126 | 3/2001 |
| JP | 2001342377 | 12/2001 |
| JP | 2004517712 | 6/2004 |
| JP | 2006508074 | 3/2006 |
| JP | 3832777 | 10/2006 |
| JP | 2007532721 | 11/2007 |
| JP | 2009503196 | 1/2009 |
| JP | 2009542862 | 12/2009 |
| JP | 2010502992 | 1/2010 |
| JP | 2010513212 | 4/2010 |
| RU | 2392295 | 6/2010 |
| RU | 2445339 | 3/2012 |
| RU | 2446200 | 3/2012 |
| RU | 2459852 | 8/2012 |
| WO | 199530818 | 11/1995 |
| WO | 1995005604 | 11/1995 |
| WO | 2005121505 A2 | 12/2005 |
| WO | 2006023172 | 3/2006 |
| WO | 2007007039 | 1/2007 |
| WO | 2007147072 | 12/2007 |
| WO | 2008028074 | 3/2008 |
| WO | 2008042317 | 4/2008 |
| WO | 2008056302 | 5/2008 |
| WO | 2008130279 | 10/2008 |
| WO | 2009078745 | 6/2009 |
| WO | 2009088315 | 7/2009 |
| WO | 2009091511 | 7/2009 |
| WO | 2010043852 | 4/2010 |
| WO | 2010070600 | 6/2010 |
| WO | 2010084442 | 7/2010 |
| WO | 2010126925 | 11/2010 |
| WO | 20102129119 | 11/2010 |
| WO | 2011050046 | 4/2011 |
| WO | 2011056409 | 5/2011 |
| WO | 2011063004 | 5/2011 |
| WO | 2011081549 | 7/2011 |
| WO | 20111136678 | 11/2011 |
| WO | 2012010627 | 1/2012 |
| WO | 2012045155 | 4/2012 |
| WO | 2013158306 | 10/2013 |
| WO | 2013188413 | 12/2013 |

OTHER PUBLICATIONS

Office Action from U.S. Appl. No. 12/908,411 dated Aug. 19, 2015.
Search Report from European Patent Application No. 12828438.7 dated Aug. 18, 2015.
International Search Report and Written Opinion from PCT/US2015/18374 dated May 28, 2015.
http://www.balcoindia.com/operation/bauxite2.aspx downloaded on Aug. 14, 2015.
http://www.aqua-calc.com/page/density-table/substance/bauxite-coma-and-blank-crushed downloaded Aug. 14, 2015.
Office Action from Canadian Patent Application No. 2845840 dated Jul. 24, 2015.
International Search Report and Written Opinion from International Application No. PCT/US2015/018377 dated Jun. 5, 2015.
http://www.aqua-calc.com/page/density-tale/substance/sand-coma-and-blank-fine downloaded Aug. 14, 2015.
Office Action from U.S. Appl. No. 13/923,158 dated Jun. 4, 2015.
Response to Office Action dated Apr. 9, 2015 from U.S. Appl. No. 13/838,806 dated Sep. 2, 2015.
Patent Examination Report No. 1 from Australian Patent Application No. 2012301900 dated Oct. 15, 2015.
Notice of Allowance from U.S. Appl. No. 13/838,806 dated Dec. 24, 2015.

(56) References Cited

OTHER PUBLICATIONS

Search Report from European Patent Application No. 13778014.4 dated Nov. 19, 2015.
Patent Examination Report No. 1 from Australian Patent Application No. 2013249743 dated Dec. 18, 2015.
First Office Action from Chinese Patent Application No. 201280042615.x dated Nov. 23, 2015.
First Patent Examination Report No. 1 from Australian Patent Application No. 2013249741 dated Dec. 14, 2015.
Search Report from European Patent Application No. 13778228.0 dated Nov. 6, 2015.
Response to Office Action dated Jul. 24, 2015 from Canadian Patent Application No. 2,845,840 dated Jan. 22, 2016.
Response to Office Action dated May 6, 2015 from U.S. Appl. No. 13/599,828, filed Nov. 5, 2015.
Response to Office Action dated May 14, 2015 from Canadian Patent Application No. 2,777,748 dated Nov. 16, 2015.
Response to Office Action dated Aug. 19, 2015 from U.S. Appl. No. 12/908,411 dated Feb. 18, 2016.
Notice of Allowance from U.S. Appl. No. 13/599,828 dated Feb. 29, 2016.
First Office Action from Russian Patent Application No. 2014107250 received Apr. 25, 2016.
Final Office Action from U.S. Appl. No. 12/908,411 dated May 19, 2016.
Office Action from U.S. Appl. No. 14/197,596 dated Jun. 7, 2016.
International Search Report and Written Opinion from International Application No. PCT/US2016/026166 dated Jun. 13, 2016.
English Text of First Office Action from Chinese Patent Application No. 201380030233.x dated Aug. 19, 2016.
English Text of First Office Action from Chinese Patent Application No. 201380030270.0 dated Aug. 30, 2016.
Response to Office Action dated Jun. 6, 2016 from U.S. Appl. No. 14/197,596 dated Sep. 15, 2016.
Response to Examiner's Report dated Oct. 15, 2015 from Australian Patent Application No. 2012301900 dated Sep. 5, 2016.
Office Action from U.S. Appl. No. 14/197,596 dated Dec. 12, 2016.
Response to Office Action dated May 19, 2016 from U.S. Appl. No. 12/908,411 dated Oct. 5, 2016.
Response to First Office Action from Chinese Patent Application No. 201280042615.X dated Oct. 28, 2016, together with an English translation of the observations and amended claims only.
Response to Office Action dated Apr. 1, 2016 from Canadian Patent Application No. 2,845,840 dated Oct. 31, 2016.
Response to First Office Action from Russian Patent Application No. 2014107250 dated Jul. 5, 2016, together with an English translation of the amended set of claims only.
English translation of Decision to Grant from Russian Patent Application No. 2014107250 received Aug. 25, 2016.
Response to EP Communication dated Oct. 12, 2016 from European Patent Application No. 13778228.0 dated Dec. 15, 2016.
First Office Action from U.S. Appl. No. 15/339,986 dated Dec. 29, 2016.
Office Action from U.S. Appl. No. 15/078,371 dated Jan. 13, 2017.
Notice of Allowance from U.S. Appl. No. 14/958,112 dated Jan. 17, 2017.
Office Action for U.S. Appl. No. 15/081,037 dated Jan. 23, 2017.
First Office Action for Omani Patent Application No. OM/P/2014/00039 received Feb. 25, 2017.
Second Office Action for Chinese Patent Application No. 201280042615.X dated Feb. 21, 2017.
Office Action for U.S. Appl. No. 15/340,000 dated Feb. 17, 2017.
Response to Office Action dated Dec. 12, 2016 for U.S. Appl. No. 14/197,596 dated Mar. 13, 2017.
Office Action from Canadian Patent Application No. 2,777,748 dated May 14, 2014.
Norman, I.R., "Application of Curable Resin-Coated Proppants", SPE Production Engineering, Nov. 1992.
International Search Report and Written Opinion from International Application No. PCT/US2010/053354 dated Dec. 21, 2010.
International Preliminary Report on Patentabiltiy from International Application No. PCT/US2013/032435 dated Oct. 21, 2014.
International Preliminary Report on Patentability from International Application No. PCT/2012/05134 dated Mar. 4, 2014.
International Search Report and Written Opinion from International Application No. PCT/US2013/032424 dated Jun. 6, 2013.
International Search Report and Written Opinion from International Application No. PCT/2013/046867 dated Feb. 20, 2014.
International Search Report and Written Opinion from International Application No. PCT/US2013/032435 dated Jun. 5, 2013.
International Search Report and Written Opinion from International Application No. PCT/US2013/050098 dated Mar. 11, 2014.
International Preliminary Report on Patentability from International Application No. PCT/US2013050098 dated Dec. 23, 2014.
International Preliminary Report on Patentability from International Application No. PCT/US2013/046867 dated Dec. 23, 2014.
International Preliminary Report on Patentability from International Application No. PCT/2013/032424 dated Oct. 21, 2014.
Kim A.J. et al., "Swelling-Based Method for Preparing Stable, Functionalized Polymer Colloids" J. Am. Chem. Soc. 127(6): 1592-1593 (2005).
Written Opinion from International Application No. PCT/US2012/053134 dated Nov. 26, 2012.
Office Action from U.S. Appl. No. 13/838,806, dated Apr. 9, 2015.
Website printout, Wikipedia's monographs on Binding Constant; http://en.wikipedia/org/wiki/Binding_constant; page last modified on Feb. 1, 2014; retrieved Apr. 23, 2015; 2 pages.
Website printout, Wikipedia's monographs on Ligand; http://en.wikipedia/org/wiki/Ligand_(biochemistry); page last modified on Feb. 6, 2014; retrieved Apr. 23, 2015; 5 pages.
Clarke, Neil, "Binding equilibria", Topics in Biophysical Chemistry, 1998; http://biophysics.med.jhmi/edu/courses/pdf/bindeq.pdf; 18 pages.
Review of Chemical Equilibrium; University of Buffalo, Review of Chemical Equilibrium, University of Buffalo, www.acsu.buffalo.edu/~koudelka/Binding-constant-lectures.pdf, known prior art, 15 pages.
Thordason, Determining Association Constants from Titration Experiments in Supramolecular Chemistry, Chem. Soc. Rev. 2011, vol. 40, pp. 1305-1323.
Marina MA, Evans WJ, Berger RL; "Use of the twin-cell differential titration calorimeter for binding studies. I. EDTA and its calcium complex." J Biochem Biophys Methods. Mar. 1985; 10(5-6): 273-85.

\* cited by examiner

CALCIUM ION TOLERANT SELF-SUSPENDING PROPPANTS

CROSS REFERENCE TO RELATED APPLICATION

This application claims the benefit of U.S. Provisional Application No. 61/948,227, filed Mar. 5, 2014, which disclosure is incorporated by reference in its entirety.

BACKGROUND

In our earlier applications including Ser. No. 13/599,828, filed Aug. 30, 2012, Ser. No. 13/838,806, filed Mar. 15, 2013, Ser. No. 13/939,965, filed Jul. 11, 2013, Ser. No. 14/197,596, filed Mar. 5, 2014, and Ser. No. 61/948,212, filed Mar. 5, 2014, we disclose self-suspending proppants which take the form of a proppant particle substrate carrying a coating of a hydrogel-forming polymer. As further described there, these proppants are formulated in such a way that they rapidly swell when contacted with aqueous fracturing fluids to form hydrogel coatings which are large enough to significantly increase the buoyancy of these proppants during their transport downhole yet durable enough to remain largely intact until they reach their ultimate use locations. The disclosures of all of these earlier applications are incorporated herein by reference in their entireties.

Preferably, these self-suspending proppants are also free-flowing when dry. In this context, "dry" will be understood to mean that these proppants have not been combined with a carrier liquid such as would occur if they were present in an a fracturing fluid or other suspension or slurry. In addition, "free-flowing" will be understood to mean that any clumping or agglomeration that might occur when these proppants are stored for more than a few days can be broken up by gentle agitation.

It is well known that calcium and other divalent ions can substantially retard the ability of anionic hydrogel-forming polymers to swell when contacted with water. In this context, an "anionic hydrogel-forming polymer" will be understood to mean a hydrogel forming polymer whose hydrogel-forming properties are primarily due to pendant carboxylic groups but may also be due to other anionic groups such as sulfonate, phosphonate, sulfate and phosphate groups. This problem can be particularly troublesome when such polymers are used in hydraulic fracturing applications, because the source water used to make up the fracturing fluids used for this purpose often contain significant quantities of these ions. To this end, the self-suspending proppants of our earlier disclosures can also be adversely affected by these ions, as reflected by a reduction in the degree to which these proppants swell and hence the degree to which they become self-suspending when contacted with their aqueous fracturing fluids

SUMMARY

In accordance with this invention, we have found that the tendency of calcium and other divalent ions to adversely affect the swelling properties of the anionic hydrogel-forming polymers used to make the self-suspending proppants of our earlier applications can be lessened significantly by including a calcium binding agent in these proppants.

Thus, this invention provides a self-suspending proppant comprising a proppant particle substrate and a coating on the proppant particle substrate comprising an anionic hydrogel-forming polymer, wherein the proppant further comprises a calcium binding agent.

In addition, this invention also provides an aqueous fracturing fluid comprising an aqueous carrier liquid containing a self-suspending proppant, wherein the self-suspending proppant comprises a proppant particle substrate and a coating on the proppant particle substrate comprising anionic hydrogel-forming polymer, wherein the proppant further comprises a calcium binding agent.

In addition, this invention further provides a method for fracturing a geological formation comprising pumping this fracturing fluid into the formation.

DETAILED DESCRIPTION

Proppant Particle Substrate

As indicated above, the self-suspending proppants which are made calcium ion tolerant in accordance with this invention take the form of a proppant particle substrate carrying a coating of a hydrogel-forming polymer.

For this purpose, any particulate solid which has previously been used or may be used in the future as a proppant in connection with the recovery of oil, natural gas and/or natural gas liquids from geological formations can be used as the proppant particle substrate of the improved self-suspending proppants of this invention. In this regard, see our earlier filed applications mentioned above which identify many different particulate materials which can be used for this purpose. As described there, these materials can have densities as low as ~1.2 g/cc and as high as ~5 g/cc and even higher, although the densities of the vast majority will range between ~1.8 g/cc and ~5 g/cc, such as for example ~2.3 to ~3.5 g/cc, ~3.6 to ~4.6 g/cc, and ~4.7 g/cc and more.

Specific examples include graded sand, resin coated sand including sands coated with curable resins as well as sands coated with precured resins, bauxite, ceramic materials, glass materials, polymeric materials, resinous materials, rubber materials, nutshells that have been chipped, ground, pulverized or crushed to a suitable size (e.g., walnut, pecan, coconut, almond, ivory nut, brazil nut, and the like), seed shells or fruit pits that have been chipped, ground, pulverized or crushed to a suitable size (e.g., plum, olive, peach, cherry, apricot, etc.), chipped, ground, pulverized or crushed materials from other plants such as corn cobs, composites formed from a binder and a filler material such as solid glass, glass microspheres, fly ash, silica, alumina, fumed carbon, carbon black, graphite, mica, boron, zirconia, talc, kaolin, titanium dioxide, calcium silicate, and the like, as well as combinations of these different materials. Especially interesting are intermediate density ceramics (densities ~1.8-2.0 g/cc), normal frac sand (density~2.65 g/cc), bauxite and high density ceramics (density ~5 g/cc), just to name a few. Resin-coated versions of these proppants, and in particular resin-coated conventional frac sand, are also good examples.

All of these particulate materials, as well as any other particulate material which is used as a proppant in the future, can be used as the proppant particle substrate in making the humidity-resistant self-suspending proppants of this invention.

Hydrogel Coating

In order to make the calcium ion tolerant proppants of this invention self-suspending, the above proppant particle substrates are provided with a coating of an anionic hydrogel-forming polymer in such a way that
(1) the inventive proppants rapidly swell when contacted with their aqueous fracturing fluids, (2) the inventive proppants form hydrogel coatings which are large enough to significantly increase their buoyancy during transport downhole, thereby making these proppants self-suspending during this period, and (3) these hydrogel coatings are also durable enough to remain substantially intact until these proppants reach their ultimate use locations downhole.

In this context, "self-suspending" means that a proppant requires a lower viscosity fluid to prevent it from settling out of suspension than would otherwise be the case. In addition, "substantially intact" means that the hydrogel coating is not substantially dislodged prior to the proppant reaching its ultimate use location downhole.

Our prior applications mentioned above describe in detail how this can be done. To summarize, the following practices can be observed: To achieve hydrogel coatings which are large enough to significantly increase the buoyancy of these modified proppants in their aqueous fracturing fluids, anionic hydrogel-forming polymers are selected which are capable of taking up (i.e., forming a gel from) 10 to 1000 times their weight in water or even more. Anionic hydrogel-forming polymers which are capable of taking up at least 50 times, at least 100 times, at least 300 times, at least 500 times, at least 800 times, at least 900 times, or at least 1000 times their weight in water are particularly interesting.

In addition, the amount of such anionic hydrogel-forming polymer (on a dry solids basis) which is applied to the proppant particle substrate will generally be between about 0.1-10 wt. %, based on the weight of the proppant particle substrate. More commonly, the amount of anionic hydrogel-forming polymer which is applied will generally be between about 0.5-5 wt. %, based on the weight of the proppant particle substrate. Within these broad ranges, polymer loadings of ≤4 wt. %, ≤3 wt. %, ≤2 wt. %, and even ≤1.5 wt. %, are interesting.

By adopting these approaches, the calcium ion tolerant proppants of this invention, once hydrated, achieve an effective volumetric expansion which makes them more buoyant and hence effectively self-suspending within the meaning of this disclosure. In addition, they are also "slicker" than would otherwise be the case in that they flow more easily through the pipes and fractures through which they are transported. As a result, they can be driven farther into a given fracture than would otherwise be the case for a given pumping horsepower. Surprisingly, this advantageous result occurs even though the volumetric expansion these modified proppants exhibit is small.

In any event, the types and amounts of anionic hydrogel-forming polymer which are applied to the proppant particle substrates of this invention will generally be sufficient so that the volumetric expansion of the inventive proppants, as determined by the Settled Bed Height Analytical test described immediately below and in our earlier applications, is desirably ≥~1.5, ≥~3, ≥~5, ≥~7, ≥~8, ≥~10, ≥~11, ≥~15, ≥~17, or even ≥~28. Of course, there is a practical maximum to the volumetric expansion the inventive proppants can achieve, which will be determined by the particular type and amount of anionic hydrogel-forming polymer used in each application.

The Settled Bed Height Analytical Test mentioned above can be carried out in the following manner: In a 20 mL glass vial, 1 g of the dry modified proppant to be tested is added to 10 g of water (e.g., tap water) at approximately 20° C. The vial is then agitated for about 1 minute (e.g., by inverting the vial repeatedly) to wet the modified proppant coating. The vial is then allowed to sit, undisturbed, until the hydrogel polymer coating has become hydrated. The height of the bed formed by the hydrated modified proppant can be measured using a digital caliper. This bed height is then divided by the height of the bed formed by the dry proppant. The number obtained indicates the factor (multiple) of the volumetric expansion. Also, for convenience, the height of the bed formed by the hydrated modified proppant can be compared with the height of a bed formed by uncoated proppant, as the volume of uncoated proppant is virtually the same as the volume of a modified proppant carrying a hydrogel coating, when dry.

Note that this Settled Bed Height Analytical Test is the standard test we have been using for determining the general suitability of particular hydrogel-forming polymers for use in our basic invention. It is different from the Modified Settled Bed Height Analytical Test further described below, whose purpose is to determine the efficacy of different calcium binding agents in connection with making anionic hydrogel-forming polymers more calcium ion tolerant. The primary difference is that, in the Modified Settled Bed Height Analytical Test described below, 2500 ppm calcium is purposefully included in the water used to hydrate the hydrogel-forming polymer. In addition, in the Modified Settled Bed Height Analytical Test described below, the proppant to be tested is mixed at a shear rate of $750\ s^{-1}$ for 5 minutes rather than being mixed in the manner described above.

A second feature of the hydrogel coatings of the inventive proppants is that they rapidly swell when contacted with water. In this context, "rapid swelling" will be understood to mean that the significant increase in buoyancy the inventive proppants exhibit as a result of these coatings is achieved at least by the time these modified proppants, having been mixed with their aqueous fracturing liquids and charged downhole, reach the bottom of the vertical well into which they have been charged such as occurs, for example, when they change their direction of travel from essentially vertical to essentially horizontal in a horizontally drilled well. More typically, these coatings will achieve this substantial increase in buoyancy within 30 minutes, within 10 minutes, within 5 minutes, within 2 minutes or even within 1 minute of being combined with their aqueous fracturing liquids. As indicated above, this generally means that hydration of the anionic hydrogel-forming polymers used will be essentially complete within 2 hours, or within 1 hour, or within 30 minutes, or within 10 minutes, or within 5 minutes, or within 2 minutes or even within 1 minute of being combined with an excess of water at 20° C. As further indicated above "essentially complete" hydration in this context means that the amount of volume increase which is experienced by the inventive modified proppant is at least 80% of its ultimate volume increase.

To achieve hydrogel coatings which exhibit this rapid swelling, two separate approaches are normally followed. First, only those anionic hydrogel-forming polymers which are capable of swelling this rapidly are selected for use in this invention. Normally this means that the anionic hydrogel-forming polymers described in our earlier applications will normally be used, these polymers including hydrolyzed polyacrylamide, copolymers of acrylamide with ethylenically unsaturated anionic comonomers, copolymers of acrylamide and acrylic acid salts, poly(acrylic acid) or salts thereof, carboxymethyl cellulose, guar gum, carboxymethyl guar, carboxymethyl hydroxypropyl guar gum, hydrophobically associating swellable emulsion polymers, etc. Other anionic hydrogel-forming polymers exhibiting similar swelling properties can also be used.

Second, any compounding or treatment of these anionic hydrogel-forming polymers which would prevent these polymers from exhibiting these swelling properties, whether applied during or after coating, is avoided. So, for example, the surface crosslinking procedure described in U.S. 2008/0108524 to Willburg et al., which prevents the coated proppants described there from swelling until they reach their ultimate use location downhole, is avoided when the inventive proppants are made, since this approach would prevent the inventive proppants from being self-suspending while being transported downhole. In the same way, including excessive amounts of crosslinking agents in these anionic hydrogel-forming polymers is also avoided, since this would also prevent the inventive proppants from being self-suspending.

This is not to say that crosslinking of the anionic hydrogel coatings of the inventive proppants must be avoided altogether. On the contrary, crosslinking and other treatments of these hydrogel coatings are entirely appropriate so long as they are carried out in a manner which does not prevent the hydrogel coatings ultimately obtained from exhibiting their desirable swelling properties, as mentioned above. To this end, see Examples 6-8 in our earlier applications which describe particular examples of self-suspending proppants in which the hydrogel coating has been surface crosslinked in a manner which still enables their desired swelling properties to be achieved.

A third feature of the hydrogel coatings of our self-suspending proppants is that they are durable in the sense of remaining largely intact until these modified proppants reach their ultimate use locations downhole. In other words, these hydrogel coatings are not substantially dislodged prior to the modified proppants reaching their ultimate use locations downhole.

In this regard, it will be appreciated that proppants inherently experience significant mechanical stress when they are used, not only from pumps which charge fracturing liquids containing these proppants downhole but also from overcoming the inherent resistance to flow encountered downhole due to friction, mechanical obstructions, sudden changes in direction, etc. The hydrogel coatings of our self-suspending proppants, although inherently fragile due to their hydrogel nature, nonetheless are durable enough to resist these mechanical stresses and hence remain largely intact until they reach their ultimate use locations downhole.

As indicated in our earlier applications, coating durability can be measured by a Shear Analytical Test described in which the proppants are sheared at about 550 s$^{-1}$ for 20 minutes. (For anionic hydrogel-forming polymers which take more than 20 minutes to hydrate, longer shear times can be used.) A hydrogel coating is considered durable if the settled bed height of the proppant after being subjected to this shearing regimen, when compared to the settled bed height of another sample of the same proppant which has not be subjected to this shearing regimen, ("shearing ratio") is at least 0.2. Modified proppants exhibiting shearing ratios of >0.2, ≥0.3, ≥0.4, ≥0.5, ≥0.6, ≥0.7, ≥0.8, or ≥0.9 are desirable.

In addition to shearing ratio, another means for determining coating durability is to measure the viscosity of the supernatant liquid that is produced by the above Shear Analytical Test after the proppant has had a chance to settle. If the durability of a particular proppant is insufficient, an excessive amount of its hydrogel polymer coating will become dislodged and remain in the supernatant liquid. The extent to which the viscosity of this liquid increases is a measure of the durability of the hydrogel coating. A viscosity of about 20 cps or more when a 100 g sample of modified proppant is mixed with 1 L of water in the above Shear Analytical test indicates insufficient coating durability. Desirably, the viscosity of the supernatant liquid will be about 10 cps or less, more desirably about 5 cps or less.

To achieve hydrogel coatings which exhibit the desired degree of durability, a number of approaches can be used. First, anionic hydrogel-forming polymers having desirably high molecular weights can be used. As indicated in our earlier applications, the hydrogel coatings of our self-suspending proppants desirably form a "cage" which wholly surrounds and encapsulates the proppant particle substrate. The individual molecules of these anionic hydrogel-forming polymers can be viewed as functioning like miniature "ropes" or "strings" that entangle themselves with one another, thereby forming a continuous network of polymer chains extending around the surface of the proppant particle substrate on which they are coated. The amount of this intermolecular entangling, as well as the distance these individual molecules extend along the surface of the proppant particle substrate, increase as the lengths of these polymer chains increases. Accordingly, anionic hydrogel-forming polymers with larger molecular weights are desirably used, as the molecules forming these polymers are inherently longer.

To this end, the weight average molecular weights of the anionic hydrogel-forming polymers used to make our self-suspending proppants are normally at least 1 million Daltons, as previously indicated. More desirably, the weight average molecular weights of these polymers is ≥2.5 million, ≥5 million, ≥0.7.5 million, or even ≥10 million Daltons. Hydrogel polymers having weight average molecular weights of ≥12.5 million, ≥15 million, ≥17.5 million and even ≥20 million Daltons are particularly interesting.

A second approach that can be used to achieve hydrogel coatings exhibiting durability is to adopt a chemistry which allows at least some chemical bonding to occur between the proppant particle substrate and its hydrogel coating. In a number of embodiments of this invention, raw frac sand (i.e., frac sand whose surfaces have not been coated or treated with any other material) is coated with an anionic hydrogel-forming polymer which is an acrylamide copolymer. Such polymers contain pendant amide groups which are capable of forming weak bonds (e.g., hydrogen bonding, Van der Waals attractions, etc.) with the pendant hydroxyl groups present on the surfaces of the raw frac sand. These anionic acrylamide copolymers further contain pendant carboxylate groups which are also are capable of forming these weak bonds. These weak bonding associations can effectively increase the bond strength of the hydrogel coating, especially when the hydrogel polymers used have larger molecular weights.

In this regard, note that the improved bond strengths which are achieved by these approaches are due, at least in part, to the fact that the inventive proppants when made from these materials are heated to drying before these proppants are used. In order for hydrogen bonding and the other bonding mechanisms contemplated above to occur, heating to a suitable activation temperature is normally required. Accordingly, when hydrogen bonding and similar bonding approaches are relied on for improving bond strength, the inventive proppants are desirably heated to drying before they are used, because this ensures that these bonding associations will occur.

Another approach that can be used for chemically enhancing the bond strength between the hydrogel coating and its proppant particle substrate is to pretreat the proppant particle substrate with an appropriate chemical agent for increasing bond strength. For example, the proppant particle substrate can be pretreated with a cationic polymer such as PDAC, poly-DADMAC, LPEI, BPEI, chitosan, and cationic polyacrylamide as described in our earlier applications mentioned above, particularly in Examples 1-4 and 9 of these applications. Similarly, silane coupling agents of all different types can be used to impart chemical functionality to raw frac sand for enhancing the bond strength of anionic hydrogel-forming polymers containing complementary functional groups, as also discussed in these earlier applications. In addition, other chemical treatments can be used such as illustrated in Examples 46-54 in some of our earlier applications.

A third approach that can be used to achieve hydrogel coatings which exhibit the desired degree of durability is to include a coalescing agent in the coating composition used to form the hydrogel coated proppants. For example, as described in connection with Figs. 4a, 4b and 5 and confirmed by Examples 13 and 19 of our earlier applications, including glycerol in the anionic hydrogel-forming polymer coating composition described there substantially increases the uniformity and coherency of the hydrogel coating obtained which, in turn, substantially increases its durability. Similar glycols, polyols and other agents which promote coalescence of suspended polymer particles can also be used.

A fourth approach that can be used to increase bond strength is to form the hydrogel coating by in situ polymerization, as further discussed and exemplified in our earlier applications mentioned above, especially in Examples 15, 16 and 37 of these applications.

As can therefore be appreciated, by following the various approaches summarized above, it is possible to produce modified proppants which rapidly swell when contacted with their aqueous fracturing fluids to form proppants which become and remain self-suspending until they reach their ultimate use locations downhole.

Calcium Binding Agent

In accordance with this invention, the adverse effect of calcium and other divalent ions on the swelling properties of the self-suspending proppants described in our earlier applications which are made with anionic hydrogel-forming polymers can be lessened significantly by including a calcium binding agent in these proppants. In this context, a "calcium binding agent" will be understood to mean a material which has a substantial affinity for calcium ions in aqueous solution. In other words, a "calcium binding agent" will be understood to mean a material which has a binding constant for calcium ions which is at least similar to the binding constant for calcium ions of the carboxylic groups of the anionic hydrogel-forming polymers from which these self-suspending proppant are made. Desirably, the calcium binding agent will have a binding constant for calcium ions that is at least as great as, and in some embodiments even more than, that the binding constant of the carboxylic groups of these anionic hydrogel-forming polymers.

Binding constants are a special type of equilibrium constant, K. They are associated with the binding and unbinding reaction of a receptor, R, and a ligand, L. See, for example, Wikipedia's monographs on Binding Constant and Ligand. They can be determined by means well-known in chemistry. See, for example, Clark, Binding Equilibrium Topics in Biophysical Chemistry, http://biophysics.med.jhmi.edu/courses/pdf/bindeq.pdf; Review of Chemical Equilibrium, University of Buffalo, www.acsu.buffalo.edu/~koudelka/Binding-constant-lectures.pdf; Thordason, Determining Association Constants from Titration Experiments in Supramolecular Chemistry, Chem. Soc. Rev. 2011, vol 40, pp 1305-1323; and Marini M A, Evans W J, Berger R L; "Use of the twin-cell differential titration calorimeter for binding studies. I. EDTA and its calcium complex." J Biochem Biophys Methods. 1985 March; 10(5-6): 273-85.].

As indicated above, the particular materials selected for use as calcium binding agents accordance with this invention have binding constants for calcium ions which are at least similar to the binding constant for calcium ions of the carboxylic groups of the anionic hydrogel-forming polymers from which our self-suspending proppant are made. In this context, "similar" will be understood to mean a binding constant which is at least close enough to the binding constant of the carboxylic groups of the anionic hydrogel-forming polymers so that a significant portion of the calcium and other divalent ions in the aqueous fracturing fluid containing our self-suspending proppants is effectively prevented from interfering with the ability of these anionic hydrogel-forming polymers to swell in these fracturing fluids.

As further discussed below, it is believed that the calcium binding agent of this invention, when present in the inventive self-suspending proppants, outcompetes the hydrogel-forming polymer in connection with absorbing the calcium and other divalent cations that are present in the water being absorbed. As a result, these ions are effectively prevented from complexing with the pendant carboxylic groups of the hydrogel-forming polymer, which in turn enables this polymer to swell without adverse effect from these ions. Accordingly, the types of materials that are selected for use as calcium binding agents in accordance with this invention should have an affinity for calcium ions which is sufficient to accomplish this purpose at least to a noticeable degree. Thus, while the binding constants for calcium ions of these materials need not be as great as that of the pendant carboxylic groups of the hydrogel-forming polymers, nonetheless they should be large enough to cause a noticeable improvement in the ability of these hydrogel-forming polymers to swell when contacted with water containing any significant amount of calcium and/or other divalent ions.

Examples of suitable binding agents for use in this invention include glycolic acid, benzoic acid, phosphoric acid, the alkali metal salts of these acids and lignosulfonate.

Especially interesting binding agents for use in this invention are chelating agents, also known as "sequestering agents." As well understood in chemistry, chelating agents are compounds which are capable of forming two or more separate coordinate bonds between a polydentate ligand (i.e., a ligand capable of forming multiple bonds) and a single central atom.

Specific examples of chelating agents which can be used as the calcium binding agent of this invention include ascorbic acid, citric acid, glycolic acid, EDTA, tripolyphosphates, desferricoprogen (DFC), humic acids, fulvic acids and other humic substances capable of binding with calcium and other divalent metal ions. Especially interesting are the humic substances, particularly humic acids, fulvic acids and their K, Na and $NH_4$ salts.

In this regard, "humic substance" or "hamate" can be regarded as referring to any degraded biological matter which (a) contains aromatic groups, hydroxyl groups and carboxyl groups, (b) is resistant to further biodegradation, and (c) does not fit into any recognized category of discrete chemical compounds such as sugars, amino acids, fats and the like. Humic substances are part of an even broader category known as "soil organic matter" or "SOM," which encompasses all organic substances in soil including undecayed plant and animal tissues, their partial decomposition products and the soil biomass. Thus, SOM can be understood to include both humic substances and nonhumic substances. Nonhumic substances are all those materials that can be placed in a recognized category of discrete compounds such as sugars, amino acids, fats, and so on. Humic substances are the other components that cannot be otherwise classified or identified.

Humic substances are the major organic constituents of soil (humus), peat and coal. They can be derived from (a) naturally occurring geologic deposits of degraded organic matter such as humin, peat, coal, lignite or leonardite, (b) lignocellulosic matter such as wood, and (c) byproducts of mineral processing operations like alumina or titanium oxide extraction. They are formed by the microbial degradation of dead plant and animal remains in the soil and are resistant to further biodegradation. The precise properties and structure of a given sample depend on the water or soil source and the specific conditions of extraction. Even so, the average properties of humic substances from different sources are similar.

Humic substances are composed of three main fractions, humic acids, fulvic acids and humins. These fractions can be separated from one another by extracting the humic and fulvic acids together from soil using a strongly basic aqueous solution of sodium hydroxide or potassium hydroxide, thereby leaving the humins as an insoluble residue. The humic acids can then be precipitated out of this supernatant solution by adjusting its pH to 1 with hydrochloric acid, leaving the fulvic acids in solution.

Thus, humic acids represent the fraction of humic substances which is not soluble in water under acidic conditions (pH<2) but is soluble at higher pH values.

Fulvic acids represent the fraction of humic substances that is soluble in water under all pH conditions. They remain in solution after removal of humic acid by acidification. Fulvic acids are light yellow to yellow-brown in color.

Humin represents the fraction of humic substances that is not soluble in water at any pH including alkali. Humins are black in color.

For the purposes of this invention, humic acids and fulvic acids are useful as the calcium binding agent. In addition, less refined and unrefined humic substances containing these acids can also be used as the binding agent. For example, pulverized humin, lignin, peat, coal, lignite, leonardite, and lignocellulosic matter can be used, as can aqueous liquid extracts of these materials. Chemically modified versions of these compounds can also be used. For example, oxidized, sulfated (e.g., lignosulfonate), or alkali treated versions of humic acids, fulvic acids and these materials can also be used. The Na, K and $NH_4$ salts of these materials are especially interesting.

Humins are not generally useful as the calcium binding agent of this invention, since they are not soluble in aqueous media.

Ingredient Proportions

The amount of calcium binding agent that can be included in the inventive self-suspending proppants can vary widely, and essentially any amount can be used. Normally, the amount used will be sufficient to provide a noticeable improvement in calcium ion tolerance, i.e., the ability of these proppants to resist the adverse effect of calcium and other divalent cations on the swelling properties of these proppants. And by "noticeable," we mean that the improvement in calcium ion tolerance achieved is greater than an insubstantial or de minimis amount.

Thus, the amount of calcium binding agent to use in particular embodiments of this invention is desirably enough to achieve a noticeable improvement in the calcium ion tolerance of these proppants. In contrast, the maximum amount of calcium binding agent to use in particular embodiments of this invention depends primarily on economics in the sense that the amount cannot be so much that the inventive proppants become uneconomic to use.

In this regard, it should be appreciated that the amount of calcium binding agent selected for use in particular embodiments of this invention is not intended to cause complete stoichiometric complexing of the calcium and other divalent ions contained in the fracturing fluid in which the inventive proppants are used. This is because the amount calcium binding agent that would be necessary for this purpose would likely be too great to be practical or economic.

Rather, the object is to treat the water that absorbs into the hydrogel-forming polymer layer as it transforms into a hydrogel. In accordance with this invention, it is believed that the calcium binding agent in the inventive self-suspending proppants competes with the hydrogel-forming polymer in connection with absorbing the calcium and other divalent cations that are present in the water being absorbed. As a result, these ions are effectively prevented from complexing with the pendant carboxylic groups of the hydrogel-forming polymer, which in turn enables this polymer to swell without adverse effect from these ions. And once this polymer substantially swells, the inventive self-suspending proppants will remain self-suspending, even if exposed to significant amounts of additional calcium and other divalent ions, because its carboxylic groups will be spatially separated by distances sufficient to prevent substantial complexing from occurring. Thus, the amount of calcium binding agent to use in particular embodiments of this invention need only be enough to complex with the calcium and other divalent cations that are present in the water that will be absorbed by the hydrogel coating as it is formed. It need not be so much as to complex with all of the calcium and other divalent cations that might be present in the fracturing fluid.

In practical terms, determining the amount of a particular calcium binding agent to use in particular embodiments of this invention can easily be accomplished by routine experimentation, using enough calcium binding agent to achieve a noticeable improvement in calcium ion tolerance but not so much as to be uneconomic.

Generally speaking, the amount of calcium binding agent to use in particular embodiments of this invention will desirably be between about 3 to 100 wt. %, based on the weight of anionic hydrogel-forming polymer used to form the inventive self-suspending proppants. Amounts on the order of about 5 to 75 wt. %, about 10 to 50 wt. % or even about 25 to 45 wt. % are desirable.

In terms of the entire inventive self-suspending proppant as a whole, the amount of calcium binding agent to use in particular embodiments of this invention will normally be between about 0.05 to 1.0 wt. %, based on the weight of the entire self-suspending proppant. Amounts on the order of about 0.07 to 0.7 wt. %, about 0.08 to 0.5 wt. % or even about 0.1 to 0.4 wt. % are desirable.

Structure

The most common way of including a calcium binding agent in the calcium ion tolerant self-suspending proppants of this invention will be by including it in the coating of hydrogel-forming polymer. However, the calcium binding agent can also be included in a separate coating applied on top of the hydrogel-forming polymer coating, if desired. If so, an additional excipient or other carrier chemical or polymer can be included in such a separate coating to prevent the calcium binding agent from dissolving into the aqueous fracturing fluid too quickly to be effective.

Product Forms and Uses

As in the case of the self-suspending proppants of our earlier disclosures, the calcium ion tolerant self-suspending proppants of this invention will normally be stored and shipped in dry form. Then, after delivery to the ultimate customer, they will be combined with water and other optional chemicals to make an aqueous fracturing fluid, which will be used to fracture geological formations by pumping the fracturing fluid so made downhole.

As in the case of our earlier self-suspending proppants, the calcium ion tolerant self-suspending proppants of this invention are also desirably formulated to be free-flowing when dry. Preferably, they are formulated to be free-flowing after being subjected to a relative humidity of between about 80%-90% for one hour at 25-35° C.

Also, these self-suspending proppants are also desirably formulated so that the volumetric expansion of these proppants, as measured by a Modified Settled Bed Height Analytical Test further described below, is desirably 1.5, ≥~3, ≥~5, ≥~7, ≥~8, ≥~10, ≥~11, ≥~15, or even ≥~17. In this regard, see the following working example.

This Modified Settled Bed Height Analytical Test, whose primary purpose is to assess the efficacy of particular calcium binding agents in making particular anionic hydrogel-forming polymers more calcium ion tolerant, is carried out in the same way as the Settled Bed Height Analytical Test described earlier in this disclosure except that, in this modified analytical test, (1) the water used to hydrate the self-suspending proppants contains calcium chloride in an amount of 2500 ppm per liter and (2) the proppant to be tested is mixed at a shear rate of 750 s$^{-1}$ for 5 minutes.

EXAMPLE

In order to more thoroughly describe this invention, the following working example is provided.

100 g of 20/40 mesh sand was added to a FlackTek SpeedMixer along with 2.7 g of a commercially-available anionic polyacrylamide invert emulsion containing approximately equal amounts of a high molecular weight hydrogel-forming anionic polyacrylamide copolymer, water and a hydrocarbon carrier liquid. 0.3 g glycerol was also added, making the weight ratio of hydrogel forming polymer to glycerol in the composition about 3:1. The mixture was then stirred at 800 rpm for 30 seconds.

Next 0.3 g of sodium humate was added to the mixture and the sample was mixed for an additional 30 seconds at 800 rpm in the SpeedMixer. The sample was then dried at 100° C. for 1 hour in a forced air laboratory oven. After drying, the sample was sieved through an 18 mesh screen.

A control sample was prepared in exactly the same way, except that the humic acid sodium salt was omitted.

These samples were then analyzed for calcium ion tolerance, in particular for their ability to swell in the presence of a significant amount of calcium ion. This was done by the follow analytical test: 1 liter of water containing 2500 ppm of calcium chloride was added to each shear cell of an EC Engineering CLM4 Mixer, and the paddles of the mixer set to rotate at 275 rpm, thereby producing a shear gradient of 750 s$^{-1}$. 100 g of each proppant to be tested was then mixed for 5 minutes under these conditions, after which the mixer was stopped and the proppant allowed to settle in its shear cell. After a 10 minute settling period, the height of the settled bed of self-suspending proppant was measured.

For the purposes of comparison, the bed height of an equal quantity of 20/40 mesh sand without any coating was also compared.

The results of these analyses are set forth in the following Table 1:

TABLE 1

Effect of Humic Acid Sodium Salt

| Example | Coating | Calcium Ion Tolerance, mm bed height |
|---|---|---|
| Sand Only | None | 10 |
| Control | Hydrogel-forming Polymer Only | 11.5 |
| Invention | Hydrogel-forming Polymer Plus Humic Acid Salt | 20 |

Table 1 shows that the swelling ability of a self-suspending proppant made with an anionic hydrogel-forming polymer is significantly limited when the water in which the proppant is placed contains a substantial amount of calcium ion. However, when this same self-suspending proppant further contains a suitable amount of a humic acid sodium salt, the ability of the proppant to swell becomes much greater even though the water still contains the same amount of calcium ion.

This demonstrates the ability of a calcium binding agent to substantially reduce the adverse effect calcium ions can have on the swelling ability of self-suspending proppant made with anionic hydrogel-forming polymers.

Although only a few embodiments of this invention have been described above, it should be appreciated that many modifications can be made with departing from the spirit and scope of this invention. All such modifications are intended to be included within the scope of this invention, which is to be limited only by the following claims.

The invention claimed is:

1. A modified proppant comprising a proppant particle substrate and a coating on the proppant particle substrate comprising an anionic hydrogel-forming polymer having a weight average molecular weight of ≥5 million, wherein the proppant is self-suspending in an aqueous fracturing fluid and further comprises a calcium binding agent.

2. The modified proppant of claim 1, wherein the amount of calcium binding agent in the proppant is sufficient to achieve a noticeable improvement in calcium ion tolerance.

3. The modified proppant of claim 1, wherein the proppant is dry.

4. The modified proppant of claim 3, wherein the proppant is dry after being subjected to a relative humidity of between about 80%-90% for one hour at 25-35° C.

5. The modified proppant of claim 1, wherein the calcium binding agent is selected from the group consisting of glycolic acid, benzoic acid, phosphoric acid, the alkali metal salts of these acids and lignosulfonate.

6. The modified proppant of claim 1, wherein the calcium binding agent is a chelating agent for calcium ions.

7. The modified proppant of claim 6, wherein the calcium binding agent is selected from the group consisting of ascorbic acid, citric acid, glycolic acid, ethylenediaminetetraacetic acid (EDTA), tripolyphosphates, desferricoprogen (DFC) and a humic substance.

8. The modified proppant of claim 7, wherein the calcium binding agent is a humic substance.

9. The modified proppant of claim 8, wherein the humic substance is a humic acid, a fulvic acid or a mixture of both.

10. The modified proppant of claim 8, wherein the humic substance is selected from the group consisting of humin, lignin, peat, coal, lignite, leonardite and lignocellulosic matter.

11. The modified proppant of claim 8, wherein the humic substance is a liquid extract obtained from one or more of humin, lignin, peat, coal, lignite, leonardite and lignocellulosic matter.

12. The modified proppant of claim 8, wherein the humic substance is the reaction product obtained by subjecting one or more humic substances selected from the group consisting of humin, lignin, peat, coal, lignite, leonardite and lignocellulosic matter to an alkali treatment.

13. The modified proppant of claim 8, wherein the humic substance is the reaction product obtained by subjecting one or more humic substances selected from the group consisting of humin, lignin, peat, coal, lignite, leonardite and lignocellulosic matter to an oxidation treatment.

14. The modified proppant of claim 8, wherein the humic substance is the reaction product obtained by subjecting one or more humic substances selected from the group consisting of humin, lignin, peat, coal, lignite, leonardite and lignocellulosic matter to a sulfonation treatment.

15. The modified proppant of claim 1, wherein the density of the proppant particle substrate is 2.3 to 4.7 g/cc.

16. The modified proppant of claim 1, wherein the calcium binding agent is present in the self-suspending proppant in the form of a separate coating located on top of the anionic hydrogel-forming polymer coating.

17. An aqueous fracturing fluid comprising an aqueous carrier liquid and the modified proppant of claim 1.

18. The aqueous fracturing fluid of claim 17, wherein the modified proppant has swelled by an amount sufficient so that the volumetric expansion of this proppant, as measured by the Modified Settled Bed Height Analytical Test described in the specification, is ≥~5.

19. A method for fracturing a geological formation comprising pumping into the formation the fracturing fluid of claim 17.

20. The modified proppant of claim 1, wherein the volumetric expansion of the self-suspending proppant, as determined by the Settled Bed Height analytical test described in the specification, is ≥~1.5.

21. The modified proppant of claim 20, wherein the shearing ratio of the self-suspending proppant, as determined by the Shear analytical test described in the specification, is at least 0.2.

22. The modified proppant of claim 1, wherein the shearing ratio of the self-suspending proppant, as determined by the Shear analytical test described in the specification, is at least 0.2.

23. The modified proppant of claim 1, wherein the amount of calcium binding agent in the modified proppant is about 0.08 to about 0.5 wt. %, based on the weight of the modified proppant.

24. The modified proppant of claim 23, wherein the amount of calcium binding agent in the modified proppant is about 0.1 to about 0.4 wt. %, based on the weight of the modified proppant.

* * * * *